United States Patent [19]

Brinkmann et al.

[11] 4,228,874
[45] Oct. 21, 1980

[54] ELECTROMAGNETIC BRAKE

[75] Inventors: Karl E. Brinkmann, Dörentrup; Bernd L. Assmann, Barntrup, both of Fed. Rep. of Germany

[73] Assignee: K. Ernst Brinkmann, Industrieverwaltung, Barntrup, Fed. Rep. of Germany

[21] Appl. No.: 952,538

[22] Filed: Oct. 18, 1978

[30] Foreign Application Priority Data

Oct. 22, 1977 [DE] Fed. Rep. of Germany ....... 2747465

[51] Int. Cl.³ ............................................ F16D 59/02
[52] U.S. Cl. .................................. 188/72.1; 188/72.3; 188/163; 188/216
[58] Field of Search ...................... 188/72.3, 72.1, 216, 188/163, 161; 192/18 B, 84 PM, 84 B, 84 R, 84 A; 310/77

[56] References Cited

U.S. PATENT DOCUMENTS

| 3,357,528 | 12/1967 | Verlinde | 188/72.3 X |
| 3,732,447 | 5/1973 | Perhats | 310/77 X |

Primary Examiner—Douglas C. Butler
Attorney, Agent, or Firm—Peter K. Kontler

[57] ABSTRACT

An electromagnetic brake wherein a magnetizable armature is fixed to a rotary shaft in a motor or machine and a casing for a solenoid and a permanent magnet is non-rotatably fixed to a stationary member of the motor or machine with freedom of movement in the axial direction of the armature. When the solenoid is deenergized, the magnet maintains a friction liner in the casing in frictional engagement with and brakes the armature. The electromagnetic field which is established on energization of the solenoid assists a set of helical or leaf springs to overcome the force of the magnet and to disengage the liner from the armature. The liner can be disengaged from the armature independently of the solenoid and springs by a linkage or by two bolts whose heads engage a flange of the casing and whose shanks extend through registering holes of the flange and stationary member and mesh with nuts behind the stationary member. When the linkage is actuated or the nuts are rotated in a direction to move toward the heads of the respective bolts, the casing is moved axially of and away from the armature.

14 Claims, 3 Drawing Figures

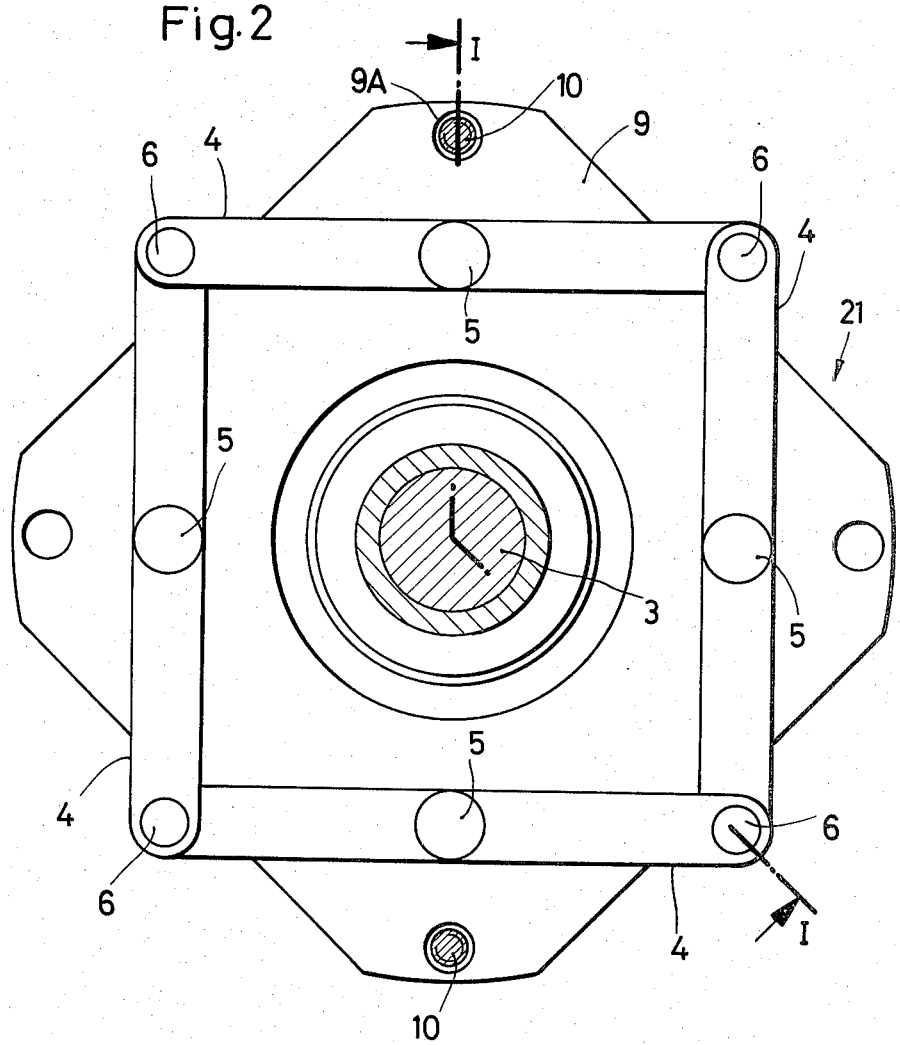

ELECTROMAGNETIC BRAKE

CROSS-REFERENCE TO RELATED APPLICATION

Certain features of the electromagnetic brake of the present invention are disclosed in the commonly owned copending application Ser. No. 952,537 filed Oct. 18, 1978 by K. E. Brinkmann et al.

BACKGROUND OF THE INVENTION

The present invention relates to electromagnetic brakes in general, and more particularly to improvements in electromagnetic brakes of the type wherein the brake is disengaged in response to energization of one or more solenoids. Still more particularly, the invention relates to improvements in electromagnetic brakes of the type wherein the rotary component is non-rotatably secured to a rotary member (e.g., to the shaft of a motor, engine or another machine) which must be braked from time to time, the stationary component is non-rotatably secured to a wall, bearing plate or another stationary member of a motor, engine or another machine, and the stationary component includes one or more permanent magnets which tend to maintain the brake in engaged condition and one or more solenoids which are energizable to effect or assist in disengagement of the stationary and rotary components.

In presently known electromagnetic brakes of the above outlined character, the rotary component is movable axially into and from frictional engagement with a liner or a like friction generating element of the stationary component which is fixed to the stationary member so that it cannot perform any angular and/or other movements with respect thereto. When the solenoid is deenergized, the permanent magnet attracts the rotary component toward and maintains the latter in frictional engagement with the stationary component. Energization of the solenoid results in establishment of an electromagnetic field which opposes the force of the permanent magnet and can be assisted by springs to repel the rotary component from the stationary component so that the rotary component is free to turn with the rotary member, e.g., with the shaft of a motor or engine.

It happens quite frequently that the braking action must be interrupted for relatively short intervals of time, e.g., during a change in setup of a machine tool or the like. In conventional electromagnetic brakes, such interruption of braking action can be achieved solely by energizing the solenoid in the casing of the stationary component, i.e., an attendant cannot manipulate the brake in order to move the rotary component away from the stationary component. This presents problems and causes undesirable delays, for example, when the brake is disconnected from the source of electrical energy, either due to failure or breakdown of the energy supply or because the energization of solenoid could endanger the attendant or attendants. Moreover, prolonged disengagement of the brake during a change of setup by energizing one or more solenoids would entail unnecessary waste in electrical energy.

OBJECTS AND SUMMARY OF THE INVENTION

An object of the invention is to provide a novel and improved electromagnetic brake wherein the rotary component can be disengaged from the non-rotatable component without resorting to energization of one or more solenoids.

Another object of the invention is to provide an electromagnetic brake wherein the rotary and non-rotating components can be disengaged from each other with a minimum of effort, by resorting to rudimentary tools and without any danger to the attendant or attendants.

A further object of the invention is to provide an electromagnetic brake whose operation is more economical than the operation of conventional brakes, especially during changes in the setup of a machine which embodies the brake.

An additional object of the invention is to provide an electromagnetic brake which can be installed in existing machines as a superior substitute for conventional brakes.

Another object of the invention is to provide a novel and improved non-rotatable component for use in an electromagnetic brake of the above outlined character.

An ancillary object of the invention is to provide novel and improved means for moving one component of the electromagnetic brake with respect to the other component.

The invention is embodied in an electromagnetic device for braking a first member (e.g., a rotary shaft which can form part of a machine) (this term is intended to embrace motors and/or engines) which is rotatable with respect to a stationary second member (e.g., a wall, a bearing plate or a like part of a machine). The device comprises a magnetizable rotary first component or armature which is fixedly secured to the first member (i.e., which shares the angular movements of but cannot perform other movements relative to the first member), a second component which is adjacent to the first component, and means for non-rotatably coupling the second component to the stationary second member with freedom of movement in the axial direction of the first component. The second component comprises at least one permanent magnet which attracts the second component to and thereby brakes the first component, and one or more solenoids which are energizable to establish an electromagnetic field tending to repel the second component from the first component, i.e., the first component and the first member cannot rotate when the solenoid or solenoids are deenergized but can rotate in response to energization of the solenoid, either because the electromagnetic field is sufficiently strong to overcome the attracting force of the permanent magnet or because the electromagnetic field is assisted by or assists suitable resilient means to overcome the attracting force of the permanent magnet.

In accordance with a presently preferred embodiment of the invention, the coupling means includes resilient means (e.g., a preferably polygonal array of leaf springs or a set of helical springs) for biasing the second component away from the first component with a force which is weaker than the force of the permanent magnet; however, when the solenoid is energized, the resulting electromagnetic field assists the springs to overcome the force of the permanent magnet and to disengage the second component from the first component so that the latter is free to rotate with the first member.

The device preferably further comprises a linkage or a system of bolts and nuts which can disengage the second component from the first component irrespective of the condition of the solenoid.

The novel features which are considered as characteristic of the invention are set forth in particular in the appended claims. The improved brake itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a sectional view as seen in the direction of arrows from the line II—II of FIG. 1.

DESCRIPTION OF THE PREFERRED EMBODIMENTS

Figure 1:
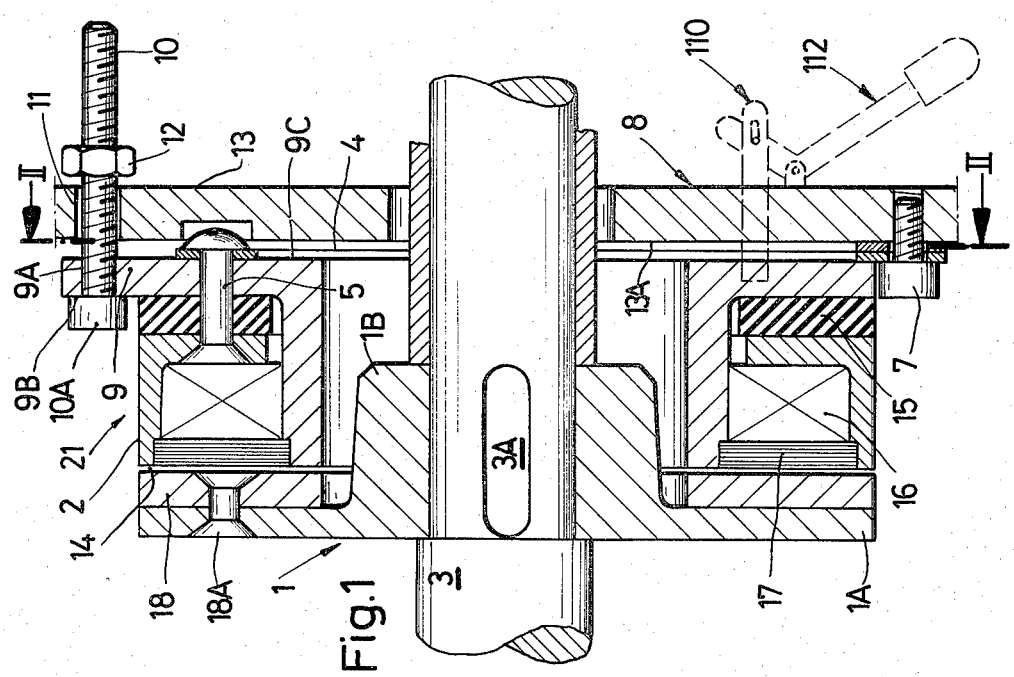
FIG. 1 is an axial sectional view of an electromagnetic brake which embodies one form of the invention and wherein the coupling means between the second component of the brake and the stationary member comprises a polygonal array of leaf springs, the section being taken in the direction of arrows as seen from the line I—I of FIG. 2.

Referring to FIGS. 1 and 2, there is shown an electromagnetic brake for a rotary member 3, e.g., the shaft of a motor, engine or another machine. The brake comprises a first component or armature 1 which is fixedly secured to the shaft 3 by one or more keys 3A or the like in such a way that it shares all angular movements and cannot move axially or otherwise of the shaft 3. A second component 21 of the brake is connected to a stationary member 8 (e.g., a wall or a bearing plate of a motor, engine or another machine) with freedom of movement in the axial direction of the component 1. The means for coupling the component 21 to the wall 8 with such freedom of axial movement comprises a polygonal array of elongated straight leaf springs 4.

The component 21 of the brake comprises a casing or support 2 for a permanent magnet 15, a solenoid 16 and a friction generating liner 17. The component 1 comprises a magnetizable disk 18 which is bolted or riveted (as at 18A) to a flange 1A of a hub 1B also forming part of the component 1. As shown in FIG. 2, the polygon formed by the leaf springs 4 is a square, and the median portion of each leaf spring 4 is permanently secured to the support 2 by a discrete rivet 5. These rivets 5 can be replaced by screws or bolts and nuts and further serve to secure the permanent magnet 15 to the support 2. The end portions of neighboring leaf springs 4 overlap each other and have registering holes 6 for screws 7 or analogous fasteners which firmly secure the end portions to the wall 8. It will be noted that, by securing the end portions of the leaf springs 4 to the wall 8, the screws 7 simultaneously secure the entire component 21 of the brake to the wall 8. As stated above, the wall 8 may constitute a stationary member (e.g., a panel or a bearing plate) of a machine.

The feature that the rivets 5 secure the median portions of the springs 4 to the support 2 and the screws 7 secure the end portions of the springs 4 to the wall 8 enables the component 21 of the brake to move in the axial direction of the component 1, i.e., axially of the shaft 3 and toward or away from the disk 18. The just discussed mounting of the leaf springs 4 prevents any angular movements of the component 21.

The permanent magnet 15 normally causes the liner 17 to frictionally engage the disk 18 and to thereby hold the component 1 and the shaft 3 against rotation with respect to the wall 8. The springs 4 tend to move the component 21 away from the component 1, i.e., to allow the component 1 and the shaft 3 to rotate. The bias of these springs 4 is weaker than the force of the permanent magnet 15. However, when the solenoid 16 is energized, it establishes an electromagnetic field whose force at least equals the difference between the bias of the springs 4 and the force of the permanent magnet 15 and which tends to move the component 21 away from the disk 18; therefore, the brake is automatically disengaged when the solenoid 16 is energized because the force of the electromagnetic field plus the bias of the springs 4 suffices to overcome the force of the permanent magnet 15.

In accordance with another feature of the invention, the brake further comprises means for disengaging the component 21 from the component 1 independently of the (energized or deenergized) condition of the solenoid 16. The disengaging means of the brake which is shown in FIGS. 1 and 2 comprises at least two elongated disengaging members 10 in the form of bolts, and nuts 12 which mate with the externally threaded portions of the shanks of the bolts 10 adjacent to a rear side or surface 13 of the wall 8, i.e., adjacent to that surface which faces away from the component 21. The shanks of the bolts 10 slidably extend through holes 11 in the wall 8 and through holes 9A in a polygonal flange 9 of the support 1. A front surface 9B of the flange 9 (namely, that surface which faces away from a front surface 13A of the wall 8) is adjacent to enlarged portions or heads 10A of the bolts 10. In normal operation, the nuts 12 are held in such axial positions that the distance between their front end faces and the rear surface 13 of the wall 8 in energized condition of the solenoid 16 (i.e., when the brake is disengaged) at least equals or exceeds the maximum width of the air gap 14 between the disk 18 and the liner 17. Thus the nuts 12 cannot interfere with the operation of the brake because they allow the permanent magnet 15 to move the liner 17 into frictional engagement with the disk 18 and to thus arrest the component 1 and the shaft 3 as soon as the solenoid 16 is deenergized. However, if an attendant wishes to disengage the component 21 from the component 1 without energizing the solenoid 16, the nuts 12 are rotated in a direction to move toward the flange 9 whereby the component 21 is moved away from the component 1 against the opposition of the permanent magnet 15 and regardless of the condition of the solenoid 16. In normal operation, the distance between the nuts 12 and the rear surface 13 of the wall 8 need not exceed (but preferably exceeds) the maximum width of the air gap 14 when the solenoid 16 is energized.

The bolts 10 and nuts 12 constitute but one form of means for disengaging the component 21 from the component 1 independently of the solenoid 16 and springs 4. For example, and as shown in FIG. 1 by broken lines, the disengaging means may constitute one or more linkages each including a post 110 which is secured to the support 2 and extends through a hole of the wall 8 and a lever 112 which is pivoted to the rear surface 13 of the wall 8 and is articulately connected (e.g., by a pin and slot connection) to the outer end portion of the post 110. When the lever 112 is pivoted clockwise, as viewed in FIG. 1, the post 110 moves the component 21 away from the rotary component 1 to thereby disengage the brake. Means (not shown) may be provided to releasably hold the lever 112 in that angular position in which the component 21 is disengaged from the component 1. The just discussed linkage constitutes but one of several possible substitutes for the disengaging means including the bolts 10 and nuts 12.

Figure 3:
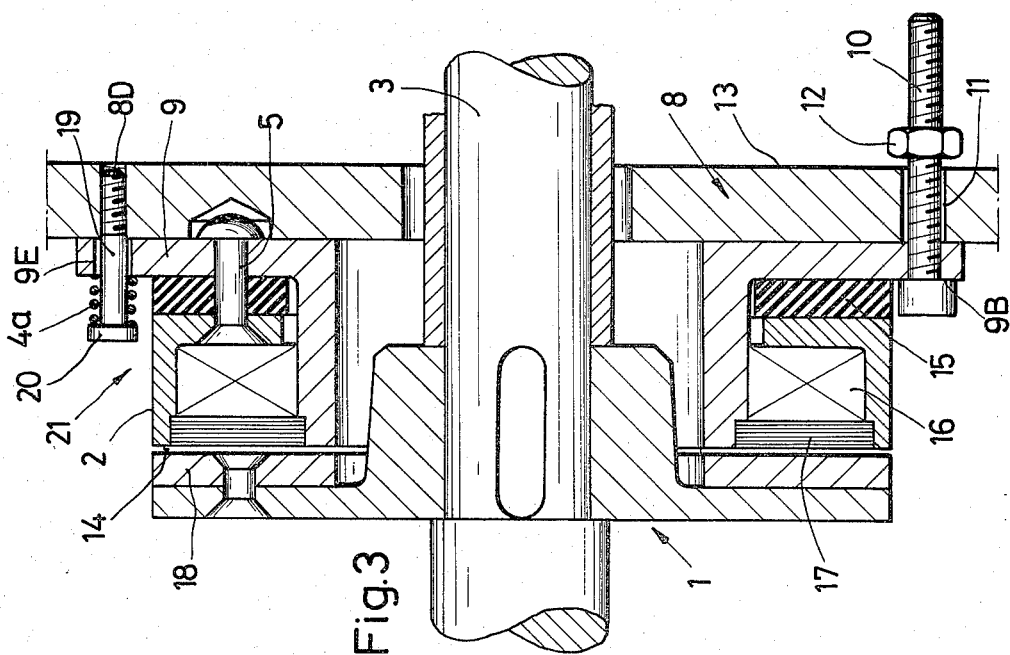
FIG. 3 is an axial sectional view of a modified electromagnetic brake wherein the coupling means comprises a set of coil springs.

FIG. 3 illustrates a modified brake wherein all such parts which are identical with or clearly analogous to the corresponding parts of the brake of FIGS. 1 and 2 are denoted by similar reference characters. The leaf springs 4 are replaced by helical springs or coil springs 4a; therefore, the rivets 5 merely serve to connect the flange 9 with the main portion of the casing or support 2 and with the permanent magnet 15. The wall 8 has tapped bores 8D for the shanks of externally threaded members or bolts 19 whose enlarged portions or heads 20 are adjacent to but spaced apart from the front surface 9B of the flange 9. The springs 4a react against the enlarged portions or heads 20 of the respective bolts and bear against the surface 9B of the flange 9 to urge the component 21 of the brake in a direction away from the component 1 which latter is fixedly secured to the shaft 3. The flange 9 has holes 9E for the shanks of the bolts 19. The (rather minimal) extent to which the component 21 can turn relative to the wall 8 depends on the clearance with which the shanks of the bolts 19 are received in the holes 9E each of which registers with a tapped bore 8D. An advantage of the brake of FIG. 3 is that its means for coupling the component 21 to the wall 8 is simpler than the corresponding coupling means of the brake shown in FIGS. 1 and 2. Furthermore, the bolts 19 can be rotated to thereby change the bias of the springs 4a. The bias of the springs 4a can almost match but should not exceed the force with which the permanent magnet 15 urges the liner 17 against the disk 18 of the component 1. When the solenoid 16 is energized, the resulting electromagnetic field invariably enables the springs 4a to disengage the liner 17 from the disk 18. The air gap is shown at 14; this gap has the maximum width because the solenoid 16 of FIG. 3 is assumed to be energized, i.e., the brake of FIG. 3 is disengaged.

The improved brake is susceptible of many additional modifications without departing from the spirit of the invention. For example, the polygonal array of discrete leaf springs 4 shown in FIGS. 1 and 2 can be replaced by a one-piece polygonal leaf spring which has neighboring portions alternately secured to the component 21 and to the wall 8. Furthermore, such polygonal array of discrete leaf springs 4 or a single polygonal leaf spring can be replaced by a circular or oval spring which also comprises neighboring portions alternately connected to the support 2 and to the wall 8.

An important advantage of the improved brake is that, in contrast to the construction of conventional electromagnetic brakes, the rotary component of the brake does not move axially, i.e., it is fixedly secured to the rotary member 3 which must be braked from time to time in response to energization of the solenoid 16. By embodying means for disengaging the component 21 from the component 1 independently of the condition of the solenoid 16, the improved brake enables an operator to disengage the component 21 from the component 1 irrespective of the condition of the solenoid 16. Furthermore, the disengaging means is mounted on the stationary member 8 and on the component 21, i.e., on parts which, as a rule, are more readily accessible than the shaft 3 and the component 1. The improved brake can be used with great advantage in machines wherein the rotary member (such as the shaft 3) is normally driven at a high speed. The springs 4 or 4a insure that the components 1 and 21 invariably define an air gap 14 when the brake is disengaged, i.e., when the solenoid 16 is energized. In normal operation, the shanks of the bolts 10 simply move axially back and forth, depending upon whether the permanent magnet 15 can overcome the bias of the springs 4 or 4a, or the springs 4 or 4a are assisted by the electromagnetic field which is established in response to energization of the solenoid 16, i.e., the nuts 12 normally remain out of contact with or barely touch the outer surface 13 of the wall 8. If the operator wishes to disengage the brake against the oppositon of the permanent magnet 15, the nuts 12 are rotated by a simple wrench or another rudimentary tool. The disengagement is even simpler and faster if the disengaging means embodies one or more linkages of the type shown in FIG. 1 or analogous disengaging means which need not be actuated by resorting to tools. The provision of one or more linkages is especially advantageous in machines wherein the component 21 must be frequently disengaged from the component 1 without energizing the solenoid 16. Examples of such machines are certain types of machine tools, e.g., turning lathes or milling machines.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

We claim:

1. An electromagnetic device for braking a first member which is rotatable with respect to a stationary second member, particularly for braking a shaft which is rotatable with respect to a stationary part of a machine, comprising a magnetizable rotary first component fixedly secured to said first member; a second component adjacent to said first component; and means for non-rotatably coupling said second component to said second member with freedom of movement in the axial direction of said first component, said second component comprising a permanent magnet which attracts and axially displaces said second component to and into braking engagement with said first component, and a solenoid energizable to establish an electromagnetic field tending to repel and axially displace said second component away from and out of the braking engagement with said first component.

2. An electromagnetic device for braking a first member which is rotatable with respect to a stationary member, particularly for braking a shaft which is rotatable with respect to a stationary part of a machine, comprising a magnetizable rotary first component fixedly secured to said first member; a second component adjacent to said first component; and means for non-rotatably coupling said second component to said second member with freedom of movement in the axial direction of said first component, said second component comprising a permanent magnet which attracts said second component to said first component with a first force and thereby brakes said first component and a solenoid energizable to establish an electromagnetic field tending to repel said second component from said first component; and said coupling means including resilient means for biasing said second component away from said first component with a lesser second force.

3. The device of claim 2, wherein said electromagnetic field tends to repel said second component from said first component with a third force which at least slightly exceeds the difference between said first and second forces so that said resilient means is free to disengage said second component from said first component in response to energization of said solenoid.

4. The device of claim 2, wherein said second component further comprises a support for said magnet and said solenoid and said support has a side facing away from said first component and adjacent to said second member, said resilient means comprising at least one leaf spring between said side and said second member, said leaf spring having a first portion secured to said support and at least one second portion secured to said second member.

5. The device of claim 2, wherein said second component further comprises a support for said magnet and said solenoid and said support has a side facing away from said first component and adjacent to said second member, said resilient means comprising a polygonal array of elongated leaf springs disposed between said side of said support and said second member, said springs having median portions secured to said support and end portions secured to said second member.

6. The device of claim 5, wherein the end portions of neighboring springs overlap each other and have registering holes, said coupling means further comprising fasteners extending through said registering holes and securing said end portions to said second member.

7. The device of claim 2, wherein said coupling means further comprises fasteners secured to said second member and said resilient means comprises springs reacting against said fasteners and bearing against said second component to urge said second component away from said first component.

8. The device of claim 7, wherein said second component further comprises a support for said solenoid and said magnet, said support having holes for said fasteners and said fasteners having enlarged portions intermediate said first component and the respective holes and each of said springs reacting against the respective enlarged portion and bearing against said support.

9. The device of claim 8, wherein said fasteners are externally threaded members meshing with said second member and being rotatable to thereby adjust the bias of said springs.

10. An electromagnetic device for braking a first member which is rotatable with respect to a stationary second member, particularly for braking a shaft which is rotatable with respect to a stationary part of a machine, comprising a magnetizable rotary first component fixedly secured to said first member; a second component adjacent to said first component; means for nonrotatably coupling said second component to said second member with freedom of movement in the axial direction of said first component, said second component comprising a permanent magnet which attracts said second component to and thereby brakes said first component, and a solenoid energizable to establish an electromagnetic field tending to repel said second component from said first component; and means for disengaging said second component from said first component against the opposition of said magnet and independently of said solenoid.

11. The device of claim 10, wherein said disengaging means comprises at least two discrete disengaging members and means for moving said disengaging members between first and second positions in one of which said magnet is free to attract said second component to said first component in deenergized condition of said solenoid and in the other of which said disengaging members maintain said second component at a predetermined distance from said first component against the opposition of said magnet.

12. The device of claim 11, wherein said second member has a first surface adjacent to said second component, a second surface facing away from said second component and first holes between said surfaces, said second component having a third surface facing away from said first surface and second holes provided in said third surface and registering with said first holes, said disengaging members including enlarged portions adjacent said third surface and shanks extending through said second holes and the registering first holes, said shanks having externally threaded portions adjacent to said second surface and said moving means including nuts meshing with said externally threaded portions.

13. The device of claim 12, wherein said components define a gap of predetermined width in the energized condition of said solenoid and the distance between said nuts and said second surface in energized condition of said solenoid normally at least equals said width so that said nuts allow said magnet to reduce the width of said gap to zero in response to deenergization of said solenoid.

14. The device of claim 10, wherein said disengaging means comprises a linkage.

* * * * *